United States Patent
Kawabata et al.

(10) Patent No.: US 8,542,128 B2
(45) Date of Patent: Sep. 24, 2013

(54) PARKING ASSIST APPARATUS AND METHOD

(75) Inventors: Yukiko Kawabata, Toyota (JP); Yasushi Makino, Mishima (JP); Yuichi Kubota, Okazaki (JP); Tomohiko Endo, Toyota (JP); Takuya Itou, Kuwana (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 513 days.

(21) Appl. No.: 12/298,037

(22) PCT Filed: Feb. 28, 2007

(86) PCT No.: PCT/JP2007/053826
§ 371 (c)(1),
(2), (4) Date: Oct. 22, 2008

(87) PCT Pub. No.: WO2007/122864
PCT Pub. Date: Nov. 1, 2007

(65) Prior Publication Data
US 2009/0243888 A1    Oct. 1, 2009

(30) Foreign Application Priority Data
Apr. 25, 2006  (JP) .................. 2006-120974

(51) Int. Cl.
*B60Q 1/48*    (2006.01)
(52) U.S. Cl.
USPC ..................... 340/932.2; 340/995.1
(58) Field of Classification Search
USPC ............ 340/435, 995.4, 995.17, 932.2, 995.1
See application file for complete search history.

(56) References Cited

U.S. PATENT DOCUMENTS

| | | | |
|---|---|---|---|
| 5,410,346 A * | 4/1995 | Saneyoshi et al. | 348/116 |
| 5,602,740 A * | 2/1997 | Nishiyama | 701/467 |
| 6,102,147 A * | 8/2000 | Shimizu et al. | 180/204 |
| 6,170,591 B1 * | 1/2001 | Sakai et al. | 180/204 |
| 6,424,895 B1 * | 7/2002 | Shimizu et al. | 701/41 |
| 6,587,760 B2 * | 7/2003 | Okamoto | 701/1 |
| 6,778,891 B2 * | 8/2004 | Tanaka et al. | 701/41 |
| 6,828,903 B2 * | 12/2004 | Watanabe et al. | 340/435 |
| 6,919,822 B2 * | 7/2005 | Tanaka et al. | 340/932.2 |
| 6,999,003 B2 * | 2/2006 | Matsukawa et al. | 340/932.2 |
| 7,053,794 B2 * | 5/2006 | Tanaka et al. | 340/932.2 |
| 7,053,795 B2 * | 5/2006 | Maemura et al. | 340/932.2 |

(Continued)

FOREIGN PATENT DOCUMENTS

| | | |
|---|---|---|
| DE | 10 2005 017 361 A1 | 11/2005 |
| EP | 1 270 367 A2 | 1/2003 |

(Continued)

OTHER PUBLICATIONS

Korean Office Action issued Oct. 15, 2010, in Patent Application No. 10-2008-7025807 (with English-language translation).

*Primary Examiner* — Jennifer Mehmood
*Assistant Examiner* — Rufus Point
(74) *Attorney, Agent, or Firm* — Oblon, Spivak, McClelland, Maier & Neustadt, L.L.P.

(57) ABSTRACT

A parking assisting apparatus that can reduce a burden of a driver at a preliminary stage of parking. The parking assisting apparatus assists parking of a vehicle and includes an obstacle detector that detects an obstacle near the vehicle and an information outputting mechanism that informs the driver of a parking space adjacent to the obstacle detected by the obstacle detector.

9 Claims, 12 Drawing Sheets

(56) References Cited

U.S. PATENT DOCUMENTS

| | | | |
|---|---|---|---|
| 7,075,456 B2* | 7/2006 | Tanaka et al. | 340/932.2 |
| 7,295,227 B1* | 11/2007 | Asahi et al. | 348/118 |
| 7,333,666 B2* | 2/2008 | Adachi | 382/243 |
| 7,369,940 B2* | 5/2008 | Frank et al. | 701/300 |
| 7,496,446 B2* | 2/2009 | Maruyama et al. | 701/436 |
| 7,679,495 B2* | 3/2010 | Beutnagel-Buchner et al. | 340/435 |
| 7,706,944 B2* | 4/2010 | Tanaka et al. | 701/41 |
| 7,739,046 B2* | 6/2010 | Satonaka et al. | 701/300 |
| 7,800,516 B2* | 9/2010 | Luke | 340/932.2 |
| 7,813,855 B2* | 10/2010 | Watanabe et al. | 701/41 |
| 7,903,842 B2* | 3/2011 | Satonaka | 382/104 |
| 7,920,070 B2* | 4/2011 | Chen et al. | 340/932.2 |
| 7,924,171 B2* | 4/2011 | Kawabata et al. | 340/932.2 |
| 2003/0090570 A1 | 5/2003 | Takagi et al. | |
| 2003/0121706 A1* | 7/2003 | Yamada et al. | 180/204 |
| 2003/0151526 A1* | 8/2003 | Tanaka et al. | 340/932.2 |
| 2003/0156045 A1* | 8/2003 | Tanaka et al. | 340/932.2 |
| 2004/0204807 A1* | 10/2004 | Kimura et al. | 701/36 |
| 2004/0260439 A1* | 12/2004 | Endo et al. | 701/36 |
| 2005/0012603 A1* | 1/2005 | Ewerhart et al. | 340/435 |
| 2005/0057374 A1* | 3/2005 | Tanaka et al. | 340/932.2 |
| 2005/0273261 A1* | 12/2005 | Niwa et al. | 701/301 |
| 2005/0285758 A1* | 12/2005 | Matsukawa et al. | 340/932.2 |
| 2006/0069478 A1 | 3/2006 | Iwama | |
| 2006/0115116 A1* | 6/2006 | Iwasaki et al. | 382/103 |
| 2006/0287826 A1* | 12/2006 | Shimizu et al. | 701/216 |
| 2009/0243888 A1* | 10/2009 | Kawabata et al. | 340/932.2 |
| 2010/0220551 A1* | 9/2010 | Akiyama et al. | 367/99 |

FOREIGN PATENT DOCUMENTS

| | | |
|---|---|---|
| EP | 1 270 367 A3 | 1/2003 |
| EP | 1 468 893 A2 | 10/2004 |
| EP | 1 468 893 A3 | 10/2004 |
| EP | 1 470 977 | 10/2004 |
| EP | 1 591 315 | 11/2005 |
| JP | 2003 81042 | 3/2003 |
| JP | 2004 114977 | 4/2004 |
| JP | 2005-9992 | 1/2005 |
| JP | 2005-14738 | 1/2005 |
| JP | 2005-178464 | 7/2005 |
| JP | 2005 335568 | 12/2005 |
| JP | 2006 71425 | 3/2006 |
| JP | 2007-290556 | 11/2007 |
| WO | WO 01/74643 A1 | 10/2001 |

* cited by examiner

FIG.8
(A)
(B)
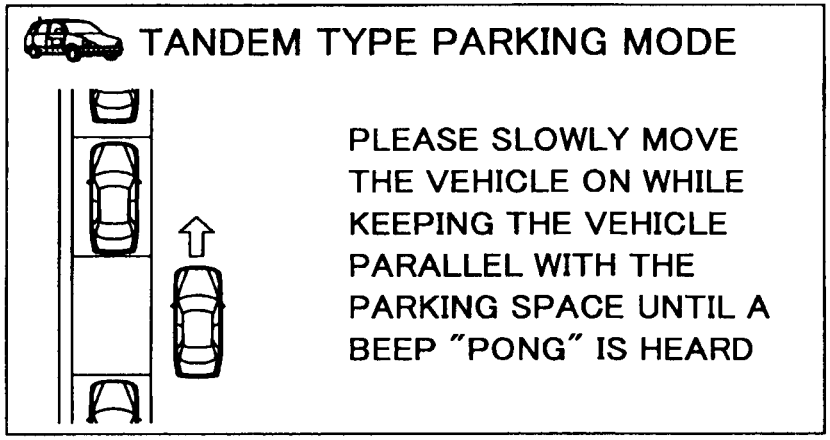

FIG.9
(A)
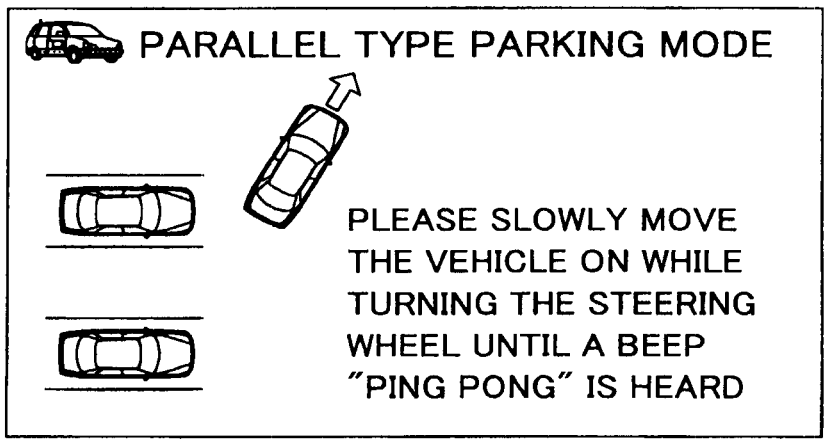
(B)
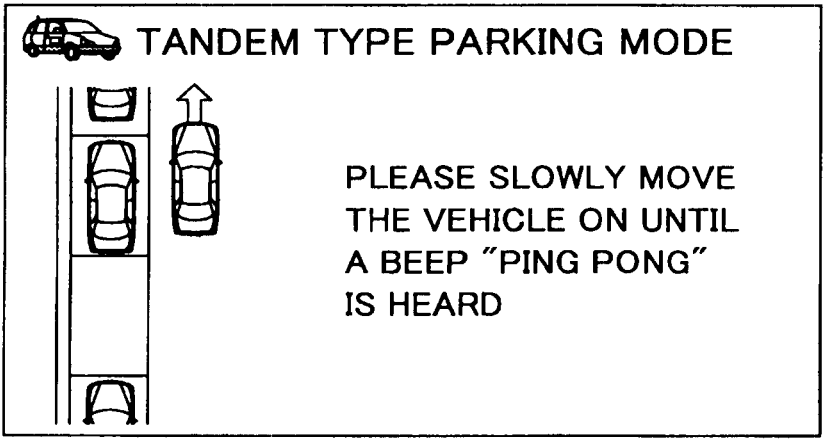

PARKING ASSIST APPARATUS AND METHOD

TECHNICAL FIELD

The present invention relates to a parking assisting apparatus and method for assisting parking of a vehicle.

BACKGROUND ART

JP2003-81042 A discloses a parking assisting apparatus comprising a first sensor for measuring a distance with respect to an obstacle in a lateral direction of the vehicle, a second sensor for measuring a travel distance of the vehicle, a yaw angle detector for detecting a yaw angle of the vehicle, guiding means for outputting guidance information as to operations of the vehicle to a driver, and a controller configured to estimate an initial stop location based on measurements of the distance and the travel distance obtained in the course of moving the vehicle forward toward the initial stop location, and provide the driver with timing information suited to start to move the vehicle backward for parking via the guiding means based on measurements of the yaw angle and the estimated initial stop location.

By the way, at a preliminary stage of parking, it is necessary for a driver to recognize a condition of obstacles (i.e., poles or pillars in parking areas or other vehicles) in order to search for parking space available in which own vehicle can be parked.

With respect to it, according to the above prior art, although adequate timing to temporarily stop for moving the vehicle backward for parking is given, the driver is not informed of a parking space available and thus the burden of the driver at the preliminary stage of parking is not reduced sufficiently.

DISCLOSURE OF INVENTION

Therefore, it is an object of the present invention to provide a parking assisting apparatus and a parking assisting method which can reduce the burden of the driver at a preliminary stage of parking.

In order to achieve the aforementioned objects, according to the first aspect of the present invention, a parking assisting apparatus for assisting parking of a vehicle comprises obstacle detecting means for detecting an obstacle near the vehicle; and information outputting means for informing a driver of a parking space adjacent to the obstacle detected by the obstacle detecting means.

According to the second aspect of the present invention, in the first aspect of the present invention, when the parking space is detected the information outputting means outputs steering instruction, and when the vehicle has come into a status under which the vehicle can be parked the information outputting means informs the driver of the status.

According to the third aspect of the present invention, in the first or second aspect of the present invention, an operation of the information outputting means can be switched on or off according to an operation of a user.

According to the fourth aspect of the present invention, in any one of the aforementioned aspects of the present invention, the detection result of the obstacle detecting means or the detection result of the parking space derived therefrom is stored even if the operation of the information outputting means is switched off.

According to the fifth aspect of the present invention, in any one of the aforementioned aspects of the present invention, the information outputting means outputs an image representing a position of the parking space on a display screen, said image being updated when a new parking space is detected.

According to the sixth aspect of the present invention, a parking assisting method of assisting parking of a vehicle comprises a parking space detecting step for detecting parking space adjacent to an obstacle based on a detection result of the obstacle near the vehicle; and an information outputting step for informing a driver of parking space when the parking space is detected in the parking space detecting step.

According to the seventh aspect of the present invention, in the sixth aspect of the present invention, in the information outputting step, when the parking space is detected in the parking space detecting step a steering instruction is output for guiding the vehicle to a parking start position from which parking in said parking space is possible, and when the vehicle has reached the parking start position from which parking in said parking space is possible as a result of movement of the vehicle according to the steering instruction, the driver is informed of reaching the parking start position.

According to the present invention, a parking assisting apparatus and method can be gained which can reduce the burden of the driver at a preliminary stage of parking.

BRIEF DESCRIPTION OF THE DRAWINGS

These and other objects, features, and advantages of the present invention will become more apparent from the following detailed description of preferred embodiments given with reference to the accompanying drawings, in which:

FIG. 8A is a diagram for illustrating a guidance image in a parallel type parking mode, while FIG. 8B is a diagram for illustrating a guidance image in a tandem type parking mode;

FIG. 9A is a diagram for illustrating a steering instruction image in a parallel type parking mode, while FIG. 9B is a diagram for illustrating a steering instruction image in a tandem type parking mode;

| | EXPLANATION FOR REFERENCE NUMBER |
|---|---|
| 10 | parking assisting apparatus |
| 12 | parking assisting ECU |
| 16 | steering angle sensor |
| 18 | vehicle speed sensor |
| 20 | back monitoring camera |
| 22 | display |
| 30 | steering system ECU |
| 41 | parking space detecting section |
| 42 | information output control section |
| 43 | deflection angle calculating section |
| 44 | parking start position calculating section |
| 48 | target track calculating section |
| 50 | reverse shift switch |
| 52 | parking switch |
| 70 | distance-measuring sensor |

BEST MODE FOR CARRYING OUT THE INVENTION

In the following, the best mode for carrying out the present invention will be described in detail by referring to the accompanying drawings.

Figure 1:
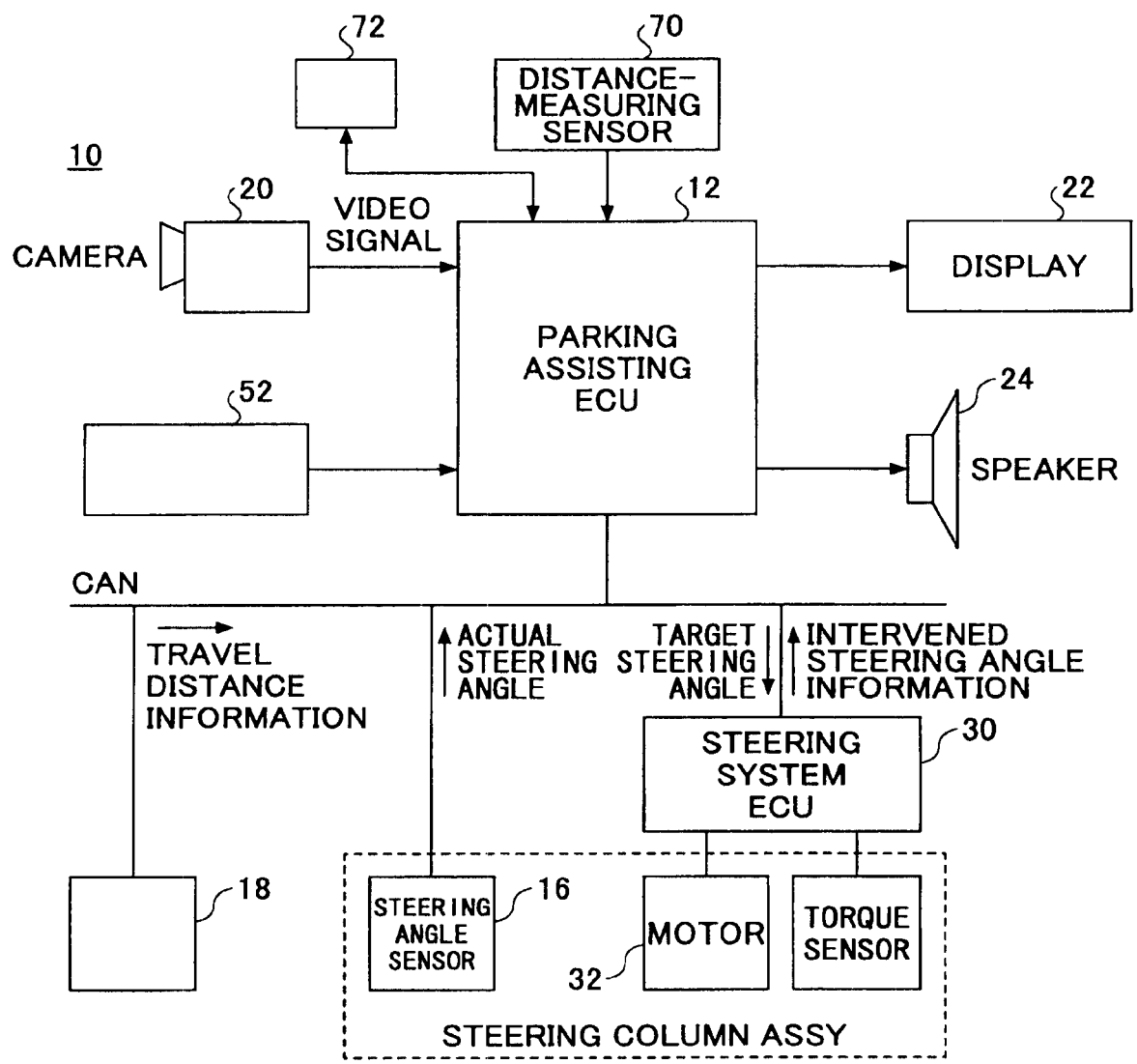
FIG. 1 is a system diagram of an embodiment of a parking assisting apparatus 10 according to the present invention.

FIG. 1 is a system diagram of an embodiment of a parking assisting apparatus 10 according to the present invention. As shown in FIG. 1, the parking assisting apparatus 10 is comprised mainly of an electronic control unit 12 (hereafter referred to as a parking assisting ECU 12). The parking assisting ECU 12 is comprised mainly of a microprocessor that includes a CPU, a ROM, a RAM, etc., (not shown) which are interconnected via appropriate buses. In the ROM are stored the computer readable programs to be carried out by the CPU and data.

The parking assisting ECU 12 is connected to a steering angle sensor 16 for detecting the steering angle of the steering wheel (not shown), and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to the rotating speed of the corresponding wheel.

The parking assisting ECU 12 is connected to a distance-measuring sensor 70 which measures the distance with respect to an obstacle using sound waves (for example, sonic waves), radio waves (for example, millimeter waves), light waves (for example, lasers), etc. The distance-measuring sensor 70 may be any means which can detect a distance such as a stereo vision camera, other than laser radar, millimeter wave radar, and sonic wave sonar, for example. The distance-measuring sensor 70 is provided on either side of the front body of the vehicle.

Figure 2:
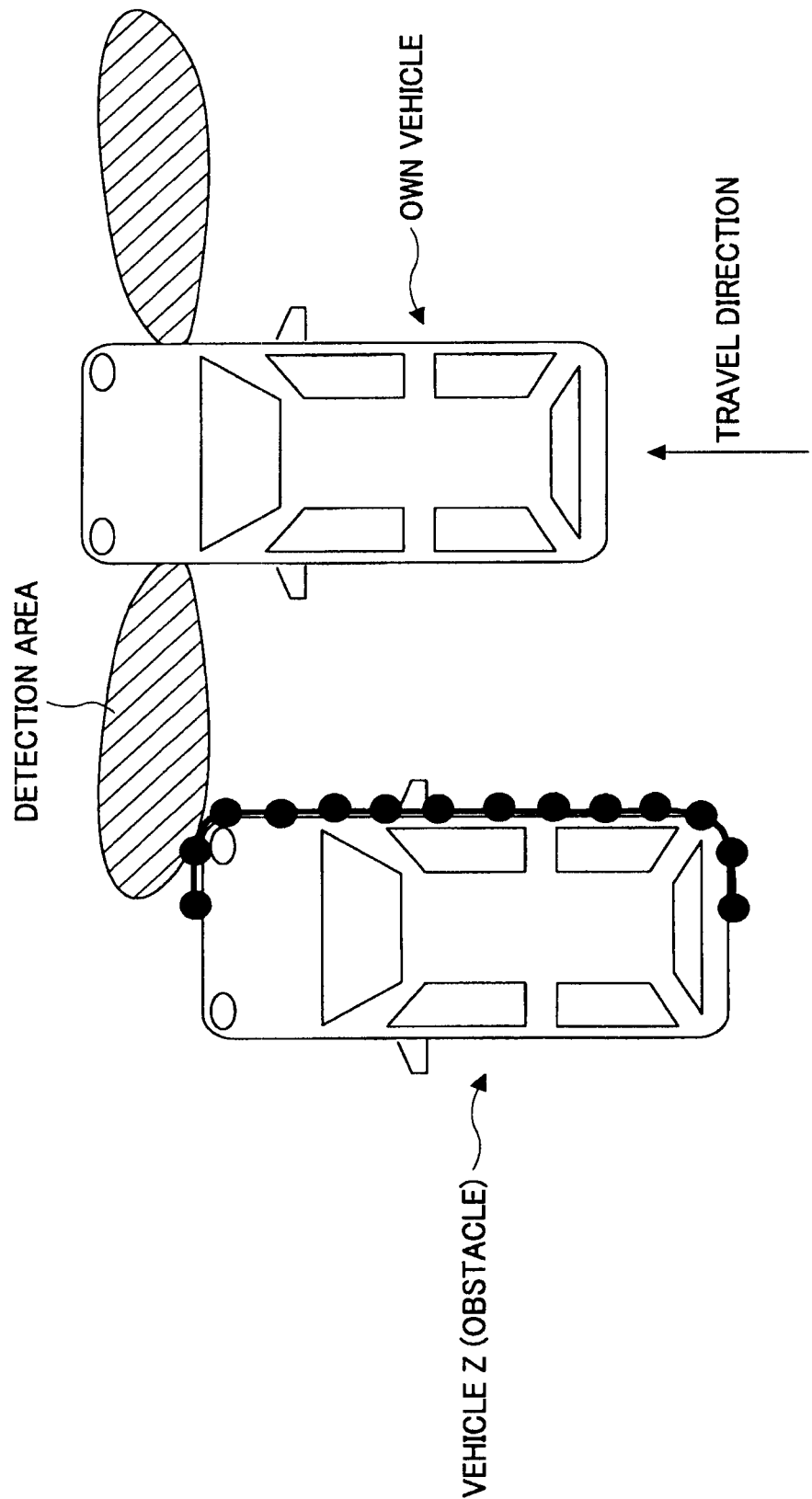
FIG. 2 is a diagram for illustrating how the distance-measuring sensor 70 detects the distance with respect to the object to be detected.

The distance-measuring sensor 70 detects the distance with respect to the obstacle located on the side of the vehicle by emitting sound waves or the like in a predetermined area, and then receiving the reflected waves, as shown in FIG. 2. The distance-measuring sensor 70 may be disposed near a bumper of the front body of the vehicle and may emit sound waves or the like in a slanting forward direction which forms an angle ranging from 17 degrees to 20 degrees with respect to the lateral direction of the vehicle, for example.

Figure 3:
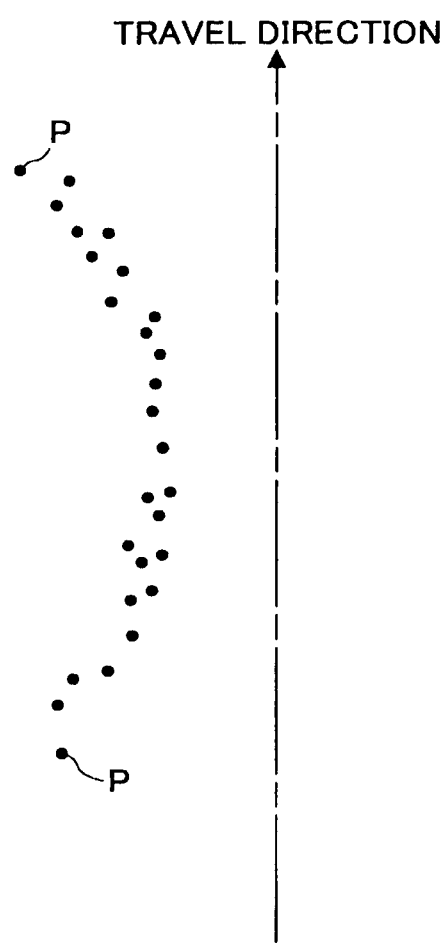
FIG. 3 is a diagram for illustrating the row of points related to the vehicle Z which can be obtained when the vehicle (own vehicle) with the distance-measuring sensor 70 runs near the vehicle Z in FIG. 2.

FIG. 3 is a diagram for illustrating the row of points related to the obstacle (vehicle Z) which can be obtained when the vehicle (own vehicle) with the distance-measuring sensor 70 runs near the vehicle Z in FIG. 2. The distance-measuring sensor 70 may output a row of points (i.e., a group comprised of reflected points of the sound wave) representing reflections from portions of the obstacle, as shown in FIG. 3, and the output data may be stored periodically in a memory 72 (for example, EEPROM).

The parking assisting ECU 12 is also connected to a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user.

The parking assisting ECU 12 determines whether the user needs assistance in parking the vehicle based on the output signal of the parking switch 52. The parking assisting ECU 12 starts parking assist control for assisting the vehicle's travel to a target parking position in the parking space, as soon as the parking switch 52 is turned on during the travel of the vehicle. The parking assist control includes not only vehicle control in the course of travel to the target parking position, such as steering control, but also information output to the driver such as a guide message for guiding the vehicle to the parking start position.

Figure 4:
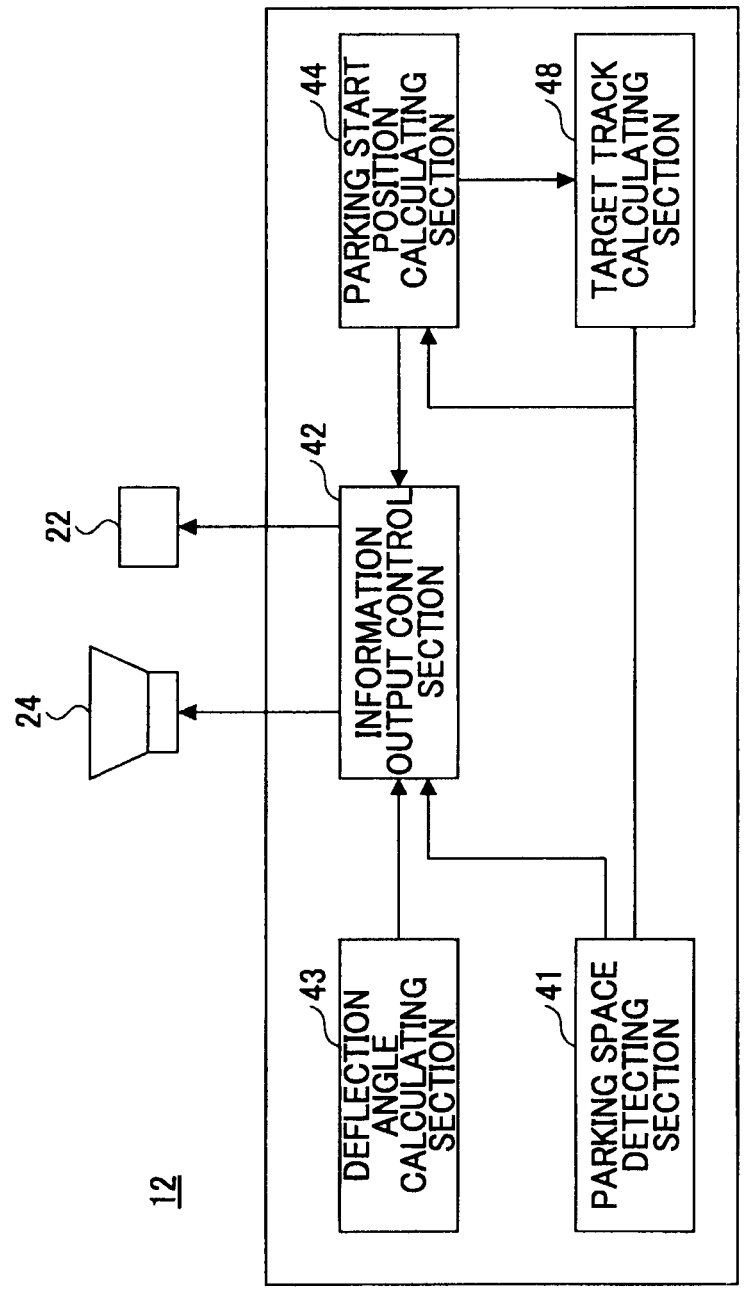
FIG. 4 is a functional diagram for illustrating main functions of the parking assisting ECU 12 according to the present embodiment.

FIG. 4 is a functional diagram for illustrating main functions of the parking assisting ECU 12 according to the present embodiment. The parking assisting ECU 12 includes a parking space detecting section 41, an information output control section 42, a deflection angle calculating section 43, a parking start position calculating section 44, and a target track calculating section 48. In the following, the configurations and functions of the respective sections are described.

The parking space detecting section 41 detects parking spaces, which may be located on the side of the vehicle, based on the detection result (i.e., row of points) of the distance-measuring sensor 70. The parking space detecting section 41 detects the parking spaces, which may be located on either side of the vehicle, based on the detection result of the distance-measuring sensors 70 provided on either side of the vehicle. The parking spaces located on each side of the vehicle are detected separately and concurrently. The detecting way can be the same on either side of the vehicle, so in the following, the detecting way related to one side of the vehicle is explained unless otherwise specified.

The way of detecting the parking spaces is different between parallel type parking and tandem type parking. In the following, one example of the way of detecting the parking spaces for parallel type parking is explained first, and then one example of the way of detecting the parking spaces for tandem type parking is explained. It is noted that the parking switch 52 may include a switch for specifying parallel type parking or tandem type parking. In this case, the parking assisting ECU 12 operates in a parking mode (i.e., parallel type parking mode or tandem type parking mode) according to the specified parking mode.

[Method of Detecting Parking Spaces for Parallel Type Parking]

Figure 5:
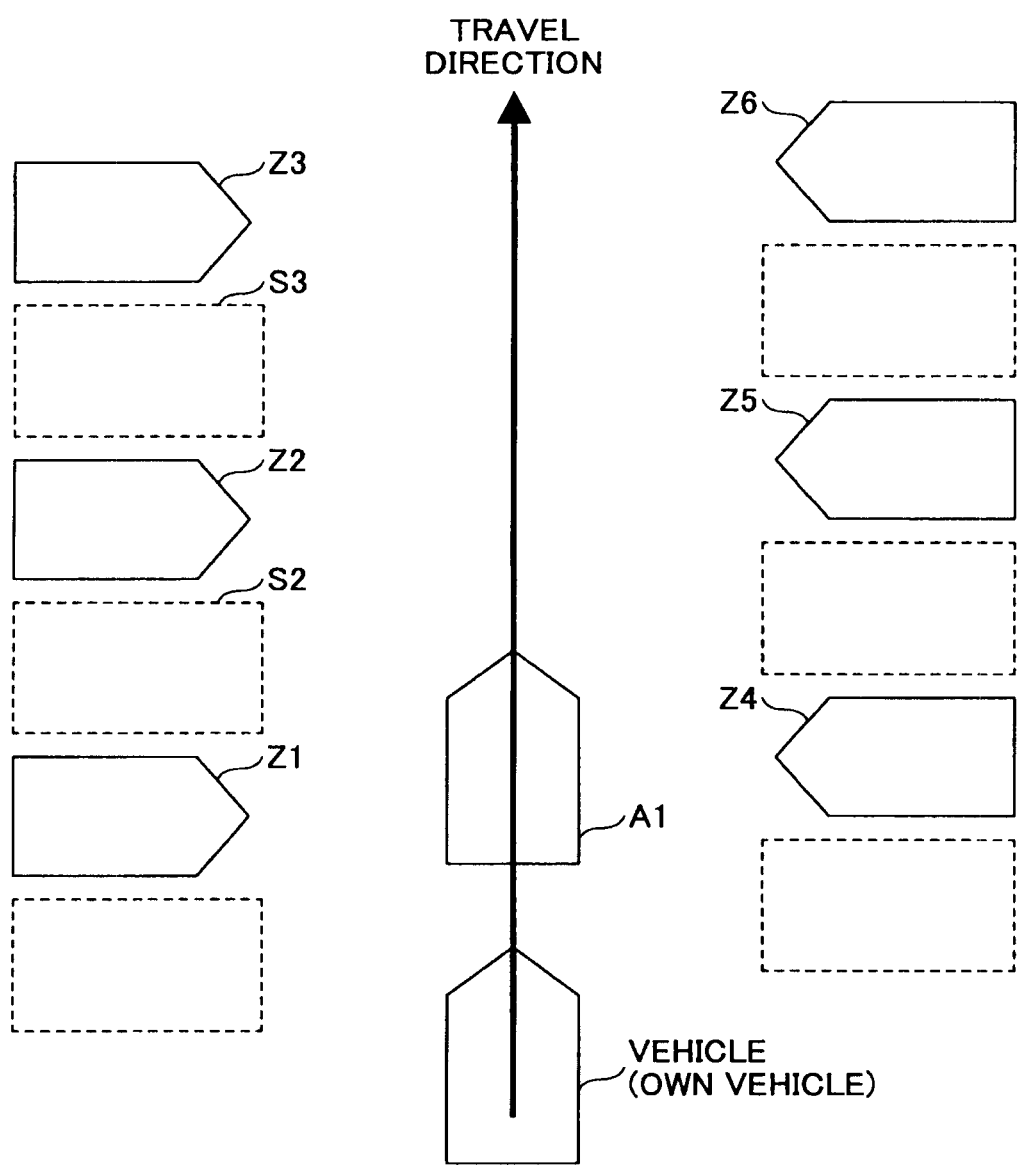
FIG. 5 is a plan view illustrating a certain situation of the parking area for parallel type parking.

FIG. 5 is a plan view illustrating a certain situation of the parking area for parallel type parking, in which situation several parking spaces exist on either side of the vehicle (as indicated by rectangles of dotted lines, and the obstacles (in this example, other parked vehicles Z) exist adjacent to the parking spaces. In FIG. 5, it is assumed that the vehicle (i.e., own vehicle) passes on the side of the obstacles (and thus the parking spaces between them) in the direction indicated by the arrow in the drawing. It is noted that the terms "back side" and "front side" are defined using the traveling direction of the vehicle (i.e., own vehicle) as a reference.

At first, as a premise, it should be understood that when the vehicle travels on the side of a certain obstacle, the area of the obstacle detected by the distance-measuring sensor 70 (i.e., the length of the row of points) becomes larger as the vehicle travels. The parking space detecting section 42 in this example determines the existence of the obstacle in a three-step manner based on the detection results of the distance-measuring sensor 70.

The first step corresponds to a stage in which the obstacle starts to be detected. For example, the first step corresponds to a stage in which the length of the row of points is smaller than 1 m. The parking space detecting section 41 sets a flag (hereafter referred to as a detection starting flag) which represents that there may be an obstacle-like object on the side of vehicle when the length of the row of points becomes greater than or equal to 80 cm, for example. Here, the reason why the term "obstacle-like object" is used instead of obstacle is because there is the possibility of noise when the length of the row of points is smaller than 1 m.

The second step corresponds to an intermediate stage and corresponds to a stage in which the length of the row of points becomes greater than or equal to 1 m, for example. The parking space detecting section 41 sets a flag (hereafter referred to as a tentative flag) which represents that the obstacle is detected tentatively.

The third step corresponds to a final stage. The third step corresponds to a stage in which the length of a section in which there is no row of points becomes greater than or equal to 50 cm after the length of the row of points becomes greater than a predetermined length (>1 m). In this situation, it can be determined that the overall obstacle is detected. Therefore, the parking space detecting section 41 sets a flag (hereafter referred to as a detection completion flag) which represents that the obstacle exists on the side of the vehicle and the detection of the obstacle has been completed.

The parking space detecting section 41 determines that there is parking space on the side of the vehicle, if the length of a section in which there is no row of points after the detection completion flag has been set becomes greater than or equal to a predetermined length (2 m, for example), and sets a flag (hereafter referred to as a parking space available flag) which represents as such. In this example, if the row of points whose length is greater than a predetermined length (>1 m) is detected and then the length of a section in which there is no row of points becomes greater than or equal to a predetermined length L1 m, the parking space detecting section 41 determines that there is parking space on the back side of the obstacle related to the set detection completion flag and sets the parking space available flag. The predetermined length L1 corresponds to a minimum opening width which is necessary as parking space for parallel type parking. The predetermined length L1 is a value which should be defined depending on the width of the own vehicle. It is noted that the predetermined length L1 is 2.5 m in this example.

When the parking space available flag is set, the driver is informed of that there is parking space on a side of vehicle under the control of the information output control section 42 as described hereafter. This notice may be output audibly and/or visually. The preferred outputting manner is described later. With this arrangement, the driver can grasp that there is parking space available on the side of the vehicle. Thus, the burden of detecting the parking space with the driver's own eyes can be reduced.

In the case of the parallel type parking, when parking in parking space on the front side of the obstacle of the vehicle Z, for example, if the driver starts to turn the steering wheel after the vehicle has passed near the front side of the vehicle Z, it often becomes difficult for the vehicle to reach the parking start position from which assisting parking in the parking space (i.e., parking assist when the vehicle moves backward) is possible. In consideration of this fact, according to the present embodiment, the parking space not on the front side but on the back side of the obstacle is to be detected/reported. In this case, since the notice for reporting the parking space is output when predetermined space (i.e., space with an opening width of 2.5 m) is detected on the back side of the obstacle, it is possible for the vehicle to reach the parking start position from which assisting parking in the parking space is possible without difficulty even if the driver starts to turn the steering wheel after the notice is output. It is noted that with respect to the parking space between two obstacles (for example, the upper and left parking space between the obstacle Z2 and the obstacle Z3), when predetermined space (i.e., space with an opening width of 2.5 m) is detected on the back side of the front side obstacle Z2, the notice for reporting the parking space on the back side of the obstacle Z2 (i.e., the parking space between the obstacle Z2 and the obstacle Z3) is output in a like manner.

[Method of Detecting Parking Spaces for Tandem Type Parking]

Figure 6:
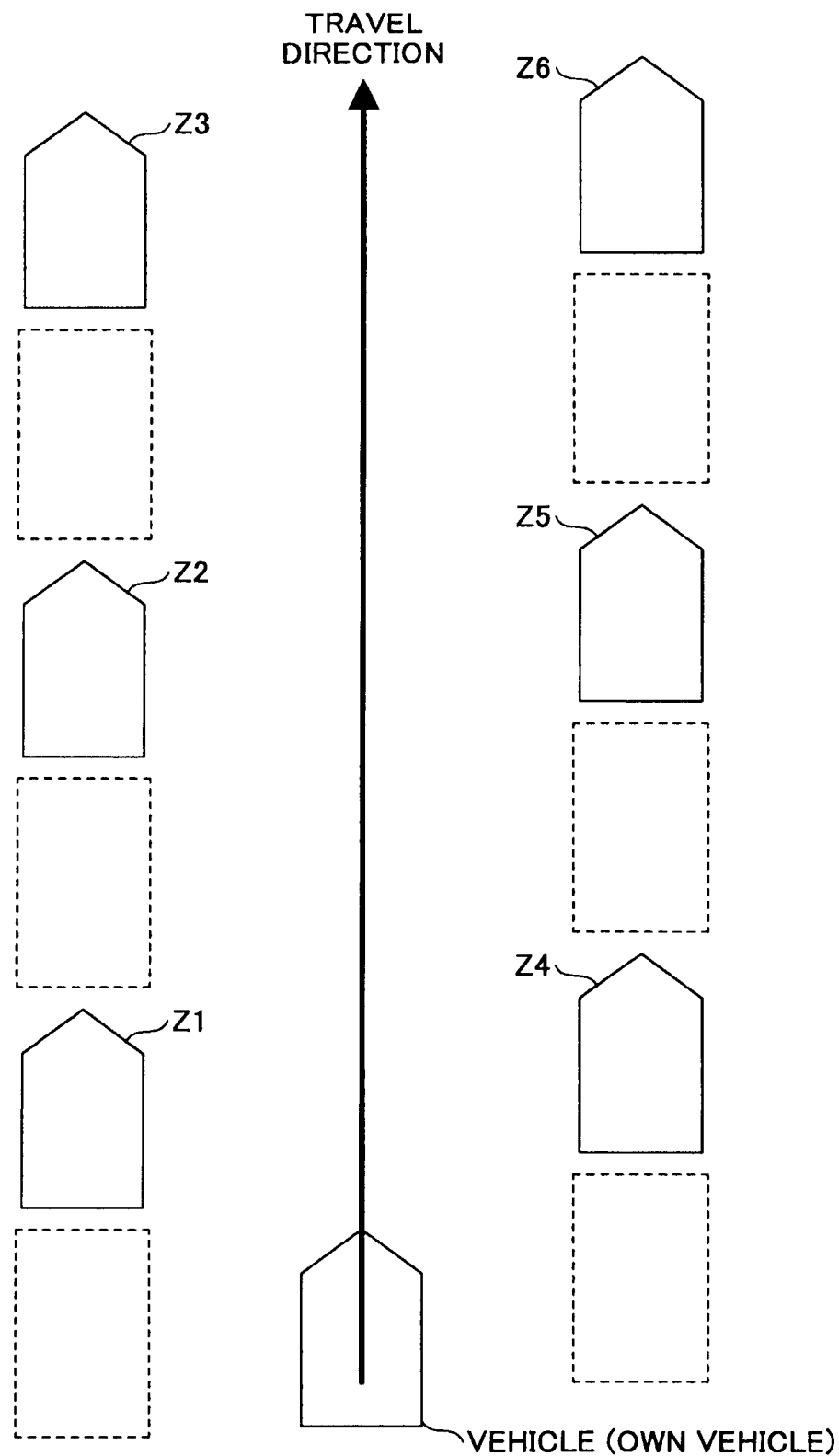
FIG. 6 is a plan view illustrating a certain situation of the parking area for tandem type parking.

FIG. 6 is a plan view illustrating a certain situation of the parking area for tandem type parking, in which situation several parking spaces exist on either side of the vehicle (as indicated by rectangles of dotted lines, and the obstacles (in this example, other parked vehicles Z) exist adjacent to the parking spaces. In FIG. 6, it is assumed that the vehicle (i.e., own vehicle) passes on the side of the obstacles (and thus the parking spaces between them) in the direction indicated by the arrow in the drawing.

In the case of tandem type parking, the parking space detecting section 41 determines the existence of the obstacle in a two-step manner based on the detection results of the distance-measuring sensor 70.

Specifically, the parking space detecting section 41 sets the detection starting flag when the length of the row of points becomes greater than or equal to 2.0 m, for example. Further, the parking space detecting section 41 sets the detection completion flag, if the row of points whose length is greater than a predetermined length (>2 m) is detected and then no row of points can be detected for a length greater than or equal to 50 cm.

If the row of points appears and the tentative flag is set in the status where there has been no row of points for a length greater than or equal to a predetermined length L2 m, the parking space detecting section 41 determines that there is parking space on the side of the vehicle and sets the parking space available flag. In other words, if no row of points exists for a length greater than or equal to a predetermined length L2 and then the row of points whose length is greater than or equal to 2 m is detected, the parking space detecting section 41 determines that there is parking space on the front side of the obstacle related to the set tentative flag and sets the parking space available flag. The predetermined length L2 corresponds to a minimum opening width which is necessary as parking space for tandem type parking. The predetermined length L2 is a value which should be defined depending on the length of the own vehicle. It is noted that the predetermined length L2 is 6 m in this example.

Further, the parking space detecting section 41 determines that there is parking space on the side of the vehicle, if the length of a section in which there is no row of points after the detection completion flag has been set becomes greater than or equal to a predetermined length (L2−0.5 m, for example), and sets the parking space available flag. In this example, if the row of points whose length is greater than a predetermined length (>2.0 m) is detected and then the length of a section in which there is no row of points becomes greater than or equal to a predetermined length L2 m, the parking space detecting section 41 determines that there is parking space on the back side of the obstacle related to the set detection completion flag and sets the parking space available flag.

Similarly, when the parking space available flag is set, the driver is informed of that there is parking space on a side of vehicle under the control of information output control section 42 as described hereafter. With this arrangement, the driver can grasp that there is parking space available on the side of the vehicle. Thus, the burden of detecting the parking space with the driver's own eyes can be reduced.

In the tandem type parking, as opposed to the parallel type parking, the area of the obstacle to be detected (i.e., a side area of a vehicle, if the obstacle is a vehicle) is large, and it is not necessary to start to turn the steering wheel at an early stage. In consideration of this fact, according to the present embodiment, in comparison with the parallel type parking, the length of the row of points when the tentative flag is set becomes larger, and the parking spaces on the front and back sides of the obstacle are to be detected/reported. In this case, since the notice for reporting the parking space is output when predetermined space (i.e., space with a opening width of 6 m) is detected on the front side of the obstacle or when predetermined space (i.e., space with a opening width of 6 m) is detected on the back side of the obstacle, it is possible for the vehicle to reach the parking start position, from which assisting parking in the parking space is possible without difficulty, from the position where the notice is output.

Figure 7:
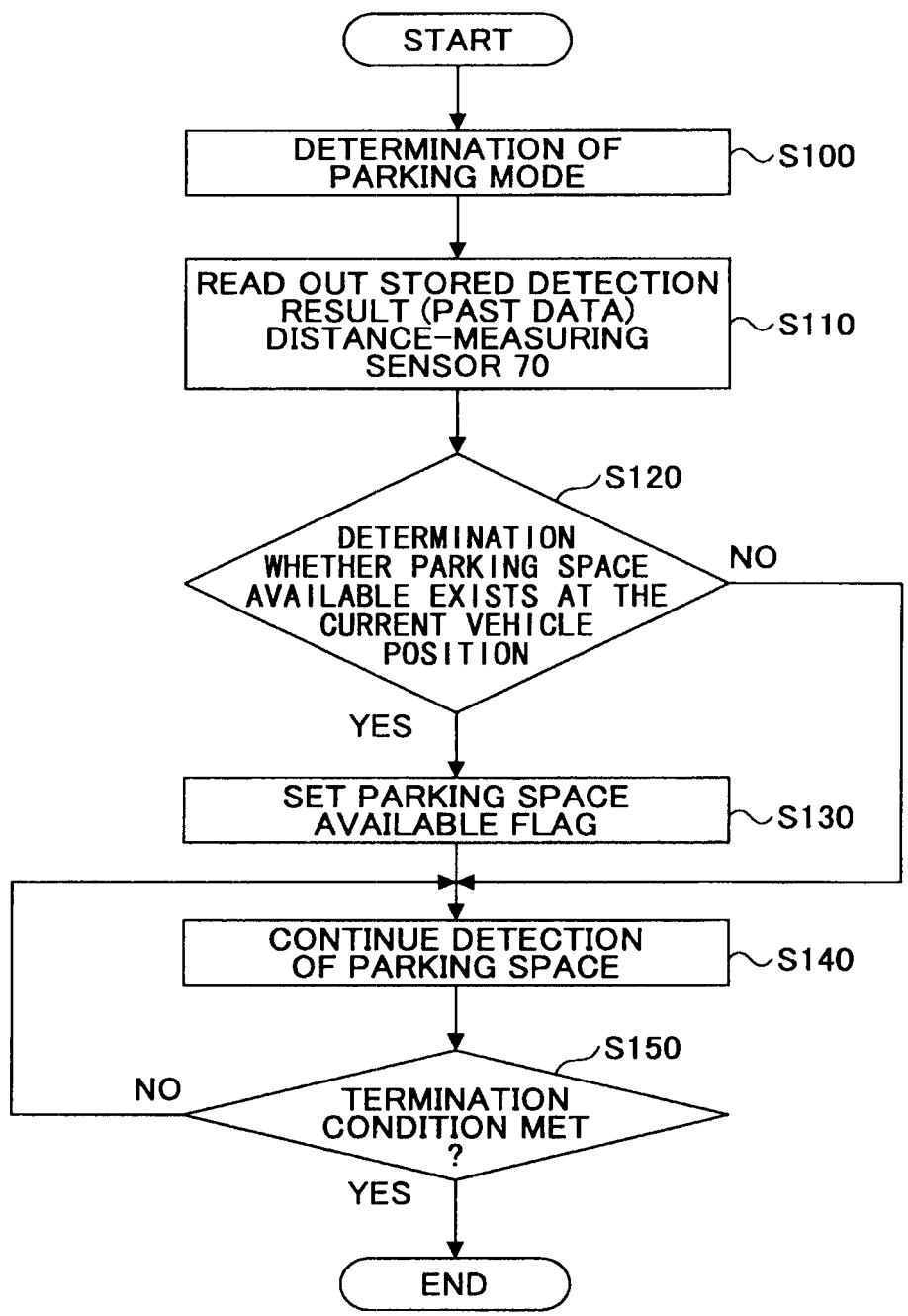
FIG. 7 is a flowchart of a main process executed by a parking space detecting section 41.

Next, the flow of a parking space detecting process which is executed by the parking space detecting section 41 is described with reference to FIG. 7. The processing routine shown in FIG. 7 is initiated when the parking switch 52 is turned on.

In step 100, the parking mode (parallel parking mode or tandem parking mode) is determined. The parking mode may be specified at the operation of the parking switch 52, or may be estimated or determined based on surrounding conditions detecting means (image recognition using a camera, for example) or map data (map data including information about locations of parking areas and types of them, for example).

In step 110, a detection result of the distance-measuring sensor 70 (i.e., row of points) obtained and stored before the parking switch 52 is turned on is read out from the memory 72. In this case, the detection result (i.e., row of points) of the distance-measuring sensor 70 which is obtained within a predetermined distance before the current vehicle position is read out from the memory 72. In this case, since only necessary data of the row of points is processed, the processing work load can be reduced. The predetermined distance may be L1+2 m in the case of the parallel type parking, and L2+2 m in the case of the tandem type parking, for example. It is noted that if L1+2 is smaller than L2+2 only the data of the row of points within a distance of L2+2 m before the current vehicle position may be stored in the memory 72, using the FIFO technique. With this arrangement, it is possible to efficiently use the capacity of the memory 72.

In step 120, it is determined whether there is any parking space available with respect to the current vehicle position by grasping the situation of the obstacles (including various flag set conditions) before the current vehicle position based on the detection result of the distance-measuring sensor 70 read out from the memory 72. This determination is performed according to the aforementioned way of detecting parking space considering the difference in parking modes. In other words, it is determined whether the parking space available flag can be set at the current vehicle position based on the past detection data. If there is any parking space available at the current vehicle position, the parking space available flag is set (step 130) and the process goes to step 140. Otherwise the parking space available flag is not set and the process goes to step 140.

In step 140, parking space detecting process (and thus notice outputting process by the information output control section 42) is continued based on the detection result of the distance-measuring sensor 70 obtained in real time subsequently (and the detection result of the distance-measuring sensor 70 obtained in the past and read out from the memory 72 depending on the vehicle position), until the appropriate terminating condition is met (for example, the parking switch 52 is turned off or the reverse shift switch 50 is turned on).

In this way, according to the present embodiment, since the detection result of the distance-measuring sensor 70 is stored under a situation in which the parking switch 52 is not turned on, it becomes possible to immediately inform the driver of the parking space available. For example, according to a comparable configuration in which the parking space is detected based on the detection result of the distance-measuring sensor 70 obtained after the parking switch 52 is turned on, when the parking switch 52 is turned on at the vehicle position A1 in FIG. 5, for example, it is not possible to report the presence of the parking space S2, even though the parking space S2 exists on the back side of the obstacle Z1 (i.e., between the obstacle Z1 and the obstacle Z2). Thus, in this comparable configuration, the notice has to start with the parking space S3 between the obstacle Z2 and the obstacle Z3. To the contrary, according to the present embodiment, since it is possible to utilize the detection result (i.e., data of row of points representing the obstacle Z1 and space thereafter) of the distance-measuring sensor 70 which is obtained within a predetermined distance before the current vehicle position, it is possible to report the parking space S2 on the back side of the obstacle Z1. In this case, when the section from the end point of the obstacle Z1 in which there is no row of points has a length greater than or equal to a predetermined length L1, it is determined that there is the parking space S2 on the back side of the obstacle Z1, and the driver is informed of as such.

Next, the process executed by the parking start position calculating section 44 is described. The parking start position calculating section 44 calculates the parking start position with which the parking assist for the parking space is possible (i.e., the parking start position from which a target track to the target parking position within the parking space can be created) in accordance with the detected parking space. There may be various ways of calculating the parking start position. For example, the parking start position calculating section 44 determines the target parking direction in the parking space (i.e., determining a direction in which the vehicle should be parked in the parking space) based on the orientation of the vehicle (i.e., deflection angle α described hereafter) when the vehicle passes through the parking space, and determines the target parking position (the position of the center of the rear axle of the vehicle in the parking space, for example), based on the end point P (see FIG. 3) of the obstacle adjacent to the parking space (i.e., the obstacle(s) related to the set tentative flag or detection completion flag). Alternatively, the orientation of the obstacle may be estimated by applying a linear approximation or approximation of functions to the row of points representing the obstacle related to the set detection completion flag, and then the target parking direction may be determined based on the estimated orientation of the obstacle, if possible. After determining the target parking direction and the target parking position, the parking start position calculating section 44 considers the maximum cornering curvature of the vehicle, etc., to determine the parking start position (including the direction at the beginning of traveling for parking) with which parking with the determined target parking direction and target parking position is possible. It is noted that since the parking start position with which the parking assist for the parking space is possible is not only one point but points within an area, the parking start position determined by the parking start position calculating section 44 may be defined by the positional area.

Next, the process executed by the deflection angle calculating section 43 is described. The respective outputs of the steering angle sensor 16 and vehicle speed sensor 18 (see FIG. 1) are input to the deflection angle calculating section 43 periodically. The deflection angle calculating section 43 calculates the deflection angle α in the predetermined section based on the respective outputs of the steering angle sensor 16 and vehicle speed sensor 18. The predetermined section starts from the point a predetermined distance (7 m, for example) before the current vehicle position and ends at the point of the current vehicle position, for example. It is noted that the sign of the deflection angle α is defined as such that a positive sign corresponds to the clockwise direction and a negative sign corresponds to the counter clockwise direction. Here, in general, the deflection angle α can be calculated by the following formula (1), using minute travel distance ds of the vehicle and curvature γ of roads (γ corresponds to the reciprocal of cornering radius R of the vehicle). According to this formula (1), the amount of change in orientation of the vehicle within a travel distance of β m (in this example, β=7) before the current vehicle position is calculated as the deflection angle α.

$$\alpha = \int_{-\beta}^{0} \gamma \cdot ds \quad (1)$$

The parking assisting ECU 12 of the present embodiment calculates minute deflection angle $\alpha_i$ at every predetermined distance (0.5 m, in this example) based on the following formula (2) which is transformed formula (1) and calculates the deflection angle α by summing the calculated respective minute deflection angles $\alpha_{1 \sim k}$.

$$\alpha = \sum_{i=1}^{k} \alpha_i \quad (2)$$

$$\alpha_i = \int_{-0.5}^{0} \gamma \cdot ds$$

At this time, the predetermined distance (0.5 m, in this example) is monitored by integrating in time the output signals of the vehicle speed sensor 18 (i.e., wheel speed pulses). Further, road curvature γ is determined based on the steering angle Ha obtained from the steering angle sensor 16, using the relationship γ=Ha/L·η (where L is the length of the wheelbase, and η is an overall gear ratio of the vehicle, that is to say, the ratio of the steering angle Ha to the steering angle of the wheel), for example. It is noted that the minute deflection angle $\alpha_i$ may be calculated, for instance, by multiplying the road curvature γ obtained every 0.01 m of minute travel distance by that minute travel distance 0.01 m, and integrating these multiplied values obtained every 0.05 m of travel distance. It is noted that the relationship between the road curvature γ and the steering angle Ha may be stored in the ROM of the parking assisting ECU 12 in the form of a map generated based on correlation data obtained in advance on a vehicle type basis.

Figure 10:
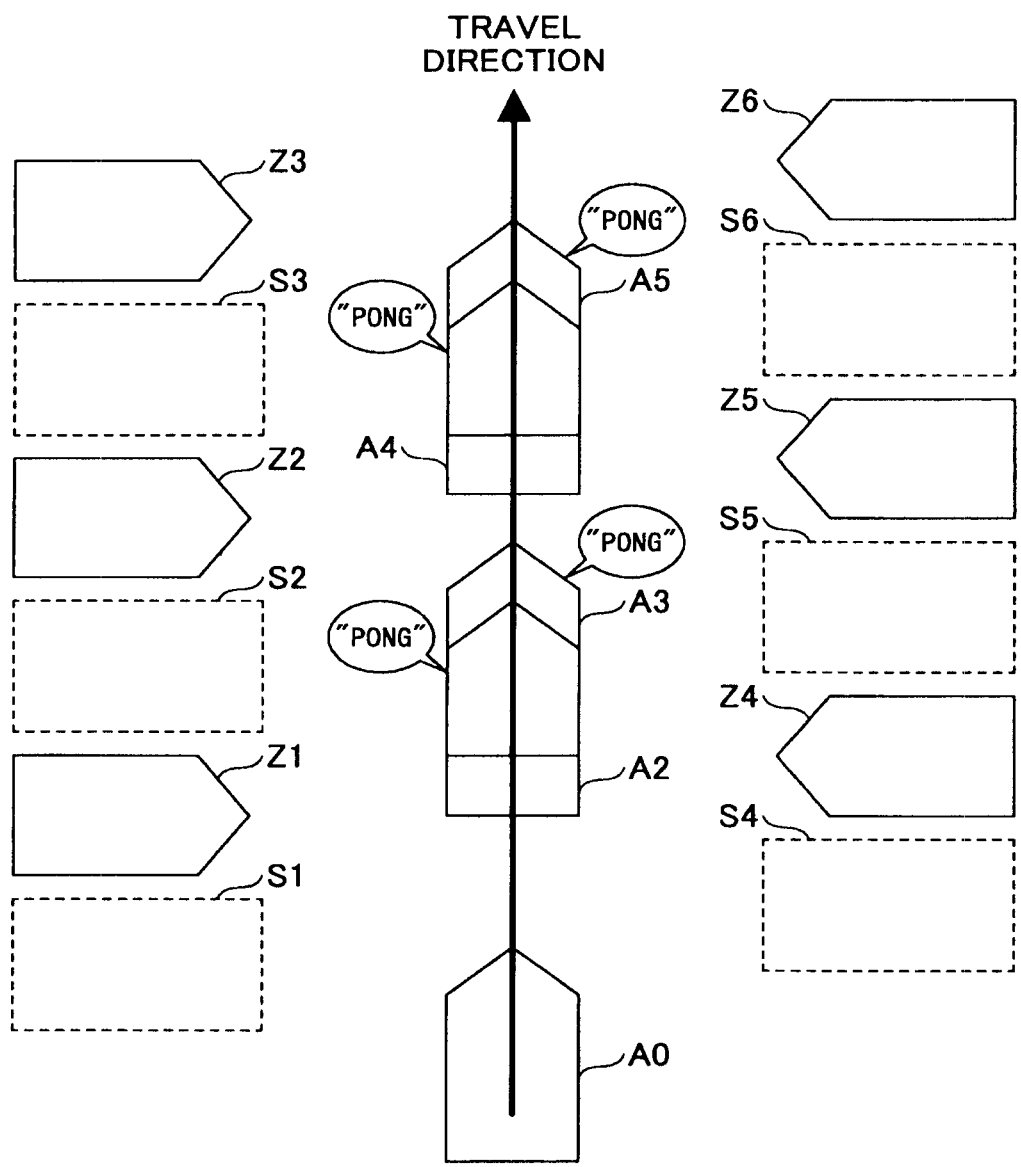
FIG. 10 is a diagram for illustrating an example of a manner in which information is output in a parallel type parking mode.
Figure 11:
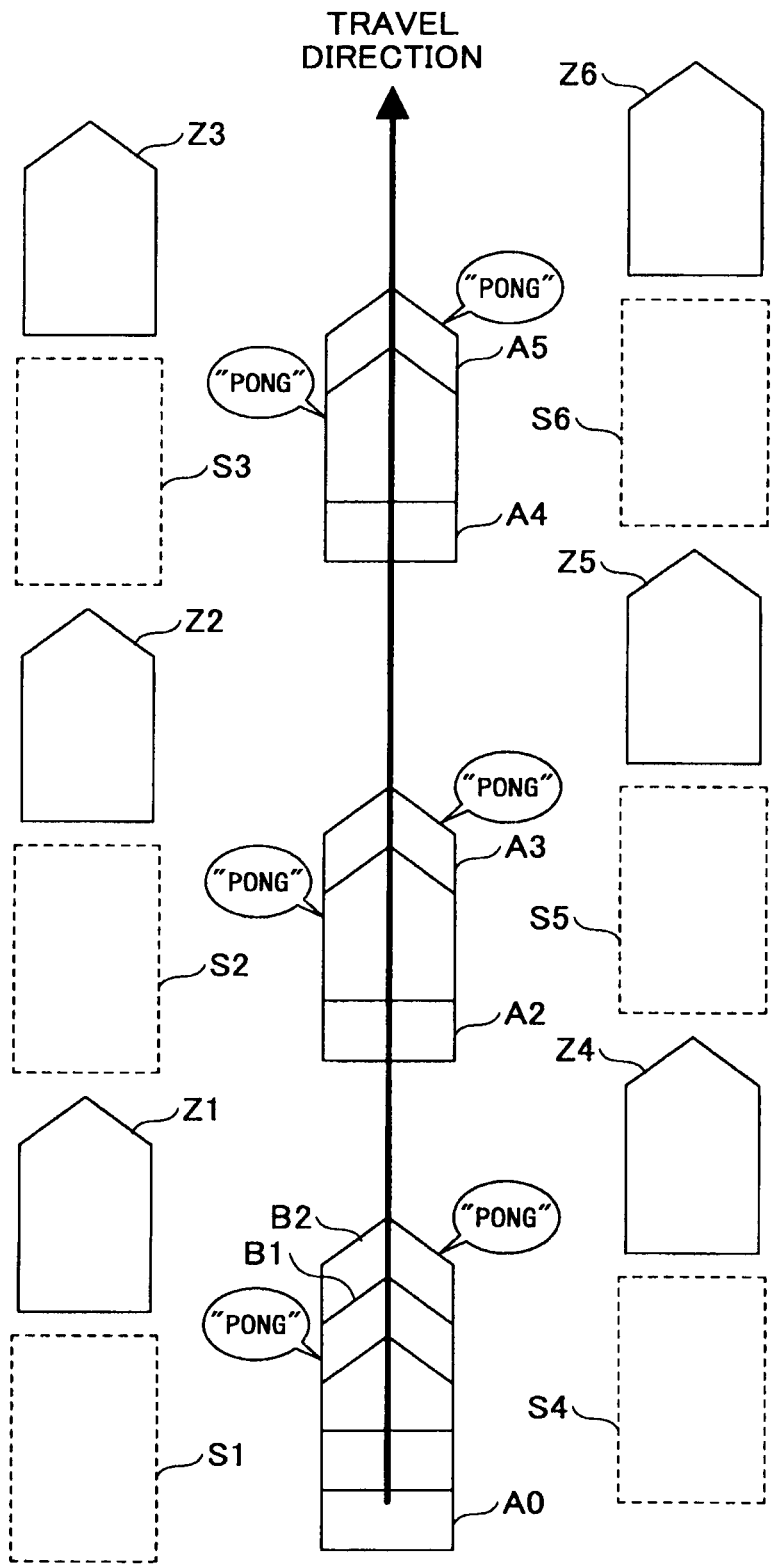
FIG. 11 is a diagram for illustrating an example of a manner in which information is output in a tandem type parking mode.

The deflection angle α calculated in this way is utilized by the information output control section 42 in determining the information output condition as described later with reference to FIG. 10 and FIG. 11. Further, the deflection angle α is utilized to recognize the traveling pattern of the vehicle (history of changes in position and orientation), which is not described here in detail. It is noted that it is desirable for the detection results of the steering angle sensor 16 and the vehicle speed sensor 18 (or data of minute deflection angle $\alpha_i$ derived therefrom) to be stored even in the situation where the parking switch 52 is not turned on, as is the case with the detection results of the distance-measuring sensor 70. With this arrangement, when the parking switch 52 is turned on, it is possible to calculate the deflection angle α in the section of the length 7 m before the vehicle position at that time. Therefore, it is possible to determine the criteria for outputting information as soon as the parking switch 52 has been turned on. For this purpose, it is also possible to store only the outputs of the steering angle sensor 16 and the vehicle speed sensor 18 obtained within a predetermined distance of 7 m before the current vehicle position in the memory 72, using the FIFO technique. With this arrangement, it is possible to efficiently use the capacity of the memory 72.

Next, the information outputting manner implemented by the information output control section 42 is described.

The information output control section 42 outputs a guidance image according to the parking mode (parallel type parking mode or tandem type parking mode) on a display 22 (see FIG. 1) when the parking switch 52 is turned on. This guidance image is displayed in a interrupting manner when the parking switch 52 is turned on (for example, this guidance image is replaced with a map display for navigation.

FIG. 8A shows a guidance image in a parallel type parking mode, and FIG. 8B shows a guidance image in a tandem type parking mode; It is noted that the guidance images shown in FIG. 8A and FIG. 8B are the examples in the case where the parking space exists on a left side of the vehicle, so they will be reversed from left to right if the parking space exists on a right side of the vehicle. Further, in the examples shown in FIG. 8A and FIG. 8B, although an image representing two obstacles adjacent to the parking space is displayed illustratively as a default screen, these obstacles may be displayed when the tentative flag or detection completion flag is set. For example, the guidance image shown in FIG. 8A is displayed when the parking switch 52 is turned on at the vehicle position A1 in FIG. 5. At that time, since the obstacle Z2 has not been detected yet, the part of the image representing obstacle Z2 may be omitted or made inconspicuous (translucent, for example). In this case, when the vehicle moves on after that and the tentative flag or detection completion flag is set, the part of the image representing obstacle Z2 may appear or may be changed from translucent form into another form. With this arrangement, the display adapted to the actual obstacle status on the side of the vehicle can be implemented, and the user can recognize the obstacle status near the vehicle detected by the parking assisting apparatus 10. It is noted that from a similar viewpoint it is also possible to feature (flashes on and off, for example) the part of the image representing an obstacle for which the tentative flag or detection completion flag is set.

The guidance images shown in FIG. 8A and FIG. 8B include a text message to the effect that please slowly move the vehicle on until a beep "pong" is heard. With this arrangement, the driver can easily understand that he/she may slowly move the vehicle on until the notice (i.e., a beep "pong") signaling the existence of the parking space is output.

When the parking space available flag is set as mentioned above, the information output control section 42 outputs the beep "pong" via a speaker(s) 24 (see FIG. 1) as well as a steering instruction for guiding the vehicle to the parking start position. It is noted that the beep "pong" may be output via the speaker(s) 24 which is located on the same side as the parking space exists, among the speakers located on left and right sides of the vehicle. With this arrangement, the driver can ascertain the side on which the parking space exists via the auditory sense.

FIG. 9A shows a steering instruction image in a parallel type parking mode, and FIG. 9B shows a steering instruction image in a tandem type parking mode. Each steering instruction image is displayed on the display 22 along with the beep "pong" when the parking space available flag is set as mentioned above. Each steering instruction includes a text message to the effect that please slowly move the vehicle on while turning the steering wheel until a beep "ping pong" is heard. With this arrangement, the driver can easily ascertain the timing of starting to turn the steering wheel, as well as understand that he/she may slowly move the vehicle on while turning the steering wheel until the notice (i.e., a beep "ping pong") signaling that the vehicle has reached the parking start position is output.

It is noted that the steering instruction may include an image which shows the position of the parking space related to that steering instruction. In this case, a rectangular pictorial part of the display which simulates the parking space may be displayed on the position corresponding to the position of the parking space when the parking space available flag is set. In this case, the pictorial part may be featured (flashed on and off, for example). With this arrangement, the driver can ascertain the parking space for which parking is being assisted, and can determine whether that parking space is the one desired.

Further, in the course of the vehicle's moving toward the parking start position after the parking switch 52 is turned on, if the vehicle speed departs from a predetermined range (exceeds 12 km/h, for example), a message "vehicle speed is too high" may be displayed on the display 22 and/or a voice message "vehicle speed is too high" may be output via the speaker 24. Similarly, in the course of the vehicle's moving toward the parking start position after the parking switch 52 is turned on, if the parking assist cannot be continued for any reason, such as the case where the parking switch 52 is turned off, a message "parking assist is now discontinued" may be output visually and/or audibly.

When the steering operation of the steering wheel is detected after the notice of the parking space, the information output control section 42 outputs a guidance image for guiding the vehicle toward the parking start position and stopping the vehicle at the parking start position, based on the parking start position determined by the parking start position calculating section 44 as mentioned above. For example, in the parallel type parking mode, if necessary, a message, such as "please start after moving toward the parking space a little bit more", "please start after moving away from the parking space a little bit more", "please start after increasing the inclination of the vehicle a little bit more", etc., may be output audibly and/or visually based on the relationship between the current vehicle position (and the direction) and the parking start position. Similarly, in the tandem type parking mode, if necessary, a message, such as "please start after moving toward the neighboring vehicle (obstacle) a little bit more", "please start after moving away from the neighboring vehicle (obstacle) a little bit more", "please start after moving the vehicle backward a little bit more", etc., may be output audibly and/or visually based on the relationship between the current vehicle position (and the direction) and the parking start position. When the vehicle has reached the parking start position, an audio message for urging the driver to stop the vehicle ("Please stop and return the steering wheel to its original position", for example) may be output and/or automatic braking may be performed.

When the current vehicle position (and the direction) corresponds to the parking start position, the information output control section 42 may output a beep "ping pong" via the speaker 24 as well as output a message, such as "if you change the shift lever to the reverse range, the system can start to assist parking when the vehicle rolls backward" audibly and/or visually.

Next, a notice outputting condition implemented by the information output control section 42 under a situation of being in the parking area for parallel type parking shown in FIG. 5 is described with reference with FIG. 10. Here, explanations are related to the notice of the respective parking space (i.e., a beep "pong"). It is noted that the vehicle travels in the direction shown in FIG. 10. In FIG. 10, the respective vehicle positions along its traveling direction are indicated by A0 (corresponding to the starting position), and A2-A5.

First, in the course of traveling from the vehicle position A0 to the vehicle position A2, the detection starting flag, the tentative flag and the detection completion flag are set in order for the obstacle Z1 based on the output of the distance-measuring sensor 70 which is located on the left side. After the detection completion flag has been set for the obstacle Z1, the parking space available flag which represents the existence of the parking space S2 on the back side of the obstacle Z1 is set, at the vehicle position A2 where the length of a section in which there is no row of points becomes greater than or equal to a predetermined length L1. When the parking space available flag is set, the information output control section 42 determines whether the deflection angle $\alpha$ (i.e., deflection angle $\alpha$ calculated by the deflection angle calculating section 43 as mentioned above) is within a range from 0 to $\theta 1$. $\theta 1$ is a relatively small angle and may be 5 degrees, for example. Further, the information output control section 42 determines whether the vehicle speed is low within a predetermined range (less than 10 km/h, for example). If the deflection angle $\alpha$ meets $0<\alpha<\theta 1$ and the vehicle speed is low within the predetermined range, the information output control section 42 outputs a notice (i.e., a beep "pong") for signaling the existence of the parking space S2 on the left side of the vehicle (i.e., the parking space S2 on the back side of the obstacle Z1). At that time, the steering instruction image as shown in FIG. 9A is displayed.

It is noted that the deflection angle $\alpha$ may be determined at all times during the parking space available flag is in the set status. In this case, even if the deflection angle $\alpha$ doesn't meet $0<\alpha<\theta 1$ when the parking space available flag is set, the notice for reporting the existence of the parking space S2 on the back side of the obstacle Z1 may be output subsequently when the deflection angle $\alpha$ comes to meet $0<\alpha<\theta 1$ and other conditions (including conditions related to the vehicle position) are met.

If the deflection angle $\alpha$ is $\theta 1<\alpha$, the information output control section 42 doesn't output the notice for reporting the existence of the parking space S2, considering that the driver doesn't have an intention to park the vehicle in the parking space S2, at the vehicle position A2. Correspondingly, the steering instruction image as shown in FIG. 9A is not displayed.

Here, the fact that the deflection angle α is 0<α<θ1 means a status in which the vehicle which has been traveling in a straight line now starts to turn right. In general, when the driver tries to perform the parallel type parking for the parking space on the left side of the vehicle, the driver tends to start to turn the steering wheel in a right direction when the vehicle passes by the parking space. Thus, according to the present embodiment, by detecting such a tendency based on the deflection angle α, it becomes possible to notify the intended parking space with high accuracy even in such a situation where parking space exists on both sides of the vehicle as shown in FIG. 10.

Similarly, in the course of traveling from the vehicle position A0 to the vehicle position A2, the detection starting flag, the tentative flag and the detection completion flag are set in order for the obstacle Z4 based on the output of the distance-measuring sensor 70 which is located on the right side. After the detection completion flag has been set for the obstacle Z4, the parking space available flag which represents the existence of the parking space S5 on the back side of the obstacle Z4 is set, at the vehicle position A3 where the length of a section in which there is no row of points becomes greater than or equal to a predetermined length L1. When the parking space available flag is set, the information output control section 42 determines whether the deflection angle α is within a range from −θ1 to 0. If the deflection angle α meets −θ1<α<0 and the vehicle speed is low within a predetermined range, the information output control section 42 outputs a notice (i.e., a beep "pong") for signaling the existence of the parking space S5 on the right side of the vehicle. At that time, the steering instruction image as shown in FIG. 9A (but reversed from left to right because this is the case of parallel type parking on the right side) is displayed.

If the deflection angle α is α<−θ1, the information output control section 42 doesn't output the notice for reporting the existence of the parking space S5, considering that the driver doesn't have an intention to park the vehicle in the parking space S5, at the vehicle position A3. Correspondingly, the steering instruction image is not displayed, either.

Here, the fact that the deflection angle α is −θ1<α<0 means a status in which the vehicle which has been traveling in a straight line now starts to turn left. In general, when the driver tries to perform the parallel type parking for the parking space on the right side of the vehicle, the driver tends to start to turn the steering wheel in a left direction when the vehicle passes by the parking space. Thus, according to the present embodiment, by detecting such a tendency based on the deflection angle α, it becomes possible to notify the intended parking space with high accuracy even in such a situation where parking space exists on both sides of the vehicle as shown in FIG. 10.

It is noted that in the course of traveling to the vehicle position A3, the detection starting flag and the tentative flag are set in order for the obstacle Z2 based on the output of the distance-measuring sensor 70 which is located on the left side. When the tentative flag is set in connection with the obstacle Z2, the parking space detecting section 42 may determines that the parking space S2 on the back side of the obstacle Z1 is a parking space between two obstacles and then set a separate parking space available flag representing as such. The steering assist for guiding to the parking start position suited for the parking space S2 between two obstacles Z1 and Z2 may not be performed at the vehicle position at which this parking space available flag is set. This is because in parallel type parking it often becomes difficult to reach an appropriate parking start position suited for the parking space S on the front side of the new obstacle Z2 even if the driver starts to turn the steering wheel at that vehicle position.

In the course of traveling to the vehicle position A4 when the vehicle moves farther, the detection completion flag is set in connection with the obstacle Z2 based on the output of the distance-measuring sensor 70 which is located on the left side, and then the row of points the distance-measuring sensor 70 outputs is interrupted. In a like manner, after the detection completion flag has been set for the obstacle Z2, the parking space available flag which represents the existence of the parking space S3 on the back side of the obstacle Z2 is set, at the vehicle position A4 where the length of a section in which there is no row of points becomes greater than or equal to a predetermined length L1. In a like manner, if the deflection angle α meets 0<α<θ1 and the vehicle speed is low within a predetermined range, the information output control section 42 outputs a notice (i.e., a beep "pong") representing the existence of the parking space S3 on the left side of the vehicle (i.e., the parking space S3 on the back side of the obstacle Z2). At that time, the steering instruction image shown in FIG. 9A is displayed.

Similarly, in the course of traveling from the vehicle position A3 to the vehicle position A4, the detection starting flag, the tentative flag and the detection completion flag are set in order for the obstacle Z5 based on the output of the distance-measuring sensor 70 which is located on the right side. After the detection completion flag has been set for the obstacle Z5, the parking space available flag which represents the existence of the parking space S6 on the back side of the obstacle Z5 is set, at the vehicle position A5 where the length of a section in which there is no row of points becomes greater than or equal to a predetermined length L1. In a like manner, if the deflection angle α meets −θ1<α<0 and the vehicle speed is low within a predetermined range, the information output control section 42 outputs a notice (i.e., a beep "pong") for signaling the existence of the parking space S6 on the right side of the vehicle. At that time, the steering instruction image as shown in FIG. 9A (but reversed from left to right because this is the case of parallel type parking on the right side) is displayed.

In this way, according to the present invention, each time when a new parking space is detected as a result of the traveling of the vehicle, outputs of the notice (i.e., a beep "pong") and transition of the screen to the steering instruction image are performed. Therefore, the driver can easily recognize the position of the parking space detected this time and the timing of starting to turn the steering wheel for each parking space detected one after another as a result of the traveling of the vehicle. Further, since the guidance notice of the parking space is provided considering the deflection angle α of the vehicle, it becomes possible to inform the driver of the parking space on the driver's intended side even in a situation where parking space exists on both sides of the vehicle as shown in FIG. 10. It is noted that a guidance image or steering instruction image representing the positions of the parking spaces on the left and right sides may be displayed at the vehicle position where steering assist can be performed for each parking space on the left and right sides.

Next, a notice outputting condition implemented by the information output control section 42 under a situation of being in the parking area for tandem type parking shown in FIG. 6 is described with reference with FIG. 11. Here, explanations are related to the notice of the respective parking space (i.e., a beep "pong"). It is noted that the vehicle travels in the direction shown in FIG. 11. In FIG. 11, the respective vehicle positions along its traveling direction are indicated by A0 (corresponding to the starting position), B1, B2 and A2-A5.

Here, it is assumed that the parking switch 52 is turned on at the vehicle position A0. When the parking switch 52 is turned on, the parking space detecting section 41 recognizes that there is no obstacle on either side of the vehicle at the current vehicle position based on the output data (sequence of outputs) of the distance-measuring sensors 70 on the left and right sides of the vehicle, which output data has been obtained and stored in the course of traveling to the vehicle position A0, as mentioned above.

At the vehicle position B1, the part of the obstacle Z1, 2.0 m long, for example, is detected based on the output data of the distance-measuring sensor 70 on the left side of the vehicle and the tentative flag is set in connection with the obstacle Z1. At that time, the parking space detecting section 41 determines whether space whose length is more than the predetermined length L2 exists on the front side of the obstacle Z1 based on the output data (including stored data) of the distance-measuring sensor 70 on the left side of the vehicle. If the space whose length is more than the predetermined length L2 exists on the front side of the obstacle Z1, the parking space detecting section 41 set the parking space available flag representing the existence of the parking space S1 on the front side of the obstacle Z1 concurrently with setting the tentative flag. When the parking space available flag is set, the information output control section 42 determines whether the deflection angle α is within a range from −θ2 to θ2. θ2 is a relatively small angle and may be 8 degrees, for example. Further, the information output control section 42 determines whether the vehicle speed is low within a predetermined range. If the deflection angle α meets |α|<θ2 and the vehicle speed is low within a predetermined range, the information output control section 42 outputs a notice (i.e., a beep "pong") signaling the existence of the parking space S1 on the left side of the vehicle (i.e., the parking space S1 on the front side of the obstacle Z1). At that time, the steering instruction image shown in FIG. 9B is displayed.

If the deflection angle α is |α|>θ2, the information output control section 42 doesn't output the notice for signaling the existence of the parking space S1, considering that this is not a situation in which the driver has an intention to park the vehicle, at the vehicle position B1. Correspondingly, the steering guidance image as shown in FIG. 9B is not outputted.

The fact that the absolute value |α| of the deflection angle α is smaller than the predetermined value θ2 means that the vehicle is substantially moving straight-ahead. In general, when the driver tries to perform the tandem type parking for the parking space, the driver tends to drive the vehicle in a straight line when the vehicle passes by the parking space. Thus, according to the present embodiment, by detecting such a tendency based on the deflection angle α, it becomes possible to determine with high accuracy whether the driver has an intention to park the vehicle.

At the vehicle position B2, the part of the obstacle Z4, 2.0 m long, for example, is detected based on the output data of the distance-measuring sensor 70 on the right side of the vehicle and the tentative flag is set in connection with the obstacle Z4. Similarly, at that time, the parking space detecting section 41 determines whether space whose length is more than the predetermined length L2 exists on the front side of the obstacle Z4 based on the output data (including stored data) of the distance-measuring sensor 70 on the right side of the vehicle. If the space whose length is more than the predetermined length L2 exists on the front side of the obstacle Z4, the parking space detecting section 41 sets the parking space available flag representing the existence of the parking space S4 on the front side of the obstacle Z4 concurrently with setting the tentative flag. When the parking space available flag is set, the information output control section 42 determines whether the deflection angle α is within a range from −θ2 to θ2. θ2 may be 8 degrees, for example. Further, the information output control section 42 determines whether the vehicle speed is low within a predetermined range. If the deflection angle α meets |α|<θ2 and the vehicle speed is low within a predetermined range, the information output control section 42 outputs a notice (i.e., a beep "pong") signaling the existence of the parking space S4 on the right side of the vehicle (i.e., the parking space S4 on the front side of the obstacle Z4). At that time, the steering instruction image as shown in FIG. 9B (but reversed from left to right because this is the case of tandem type parking on right side) is displayed.

In the course of traveling from the vehicle position B1 to the position before the vehicle position A2, setting of the detection completion flag following the tentative flag is performed in connection with the obstacle Z1 based on the output data of the distance-measuring sensor 70 on the left side of the vehicle. After the detection completion flag has been set for the obstacle Z1, the parking space available flag which represents the existence of the parking space S2 on the back side of the obstacle Z1 is set, at the vehicle position A2 where the length of a section in which there is no row of points becomes greater than or equal to a predetermined length L2. At that time, if the deflection angle α meets |α|<θ2, and the vehicle speed is low within a predetermined range, the information output control section 42 outputs a notice (i.e., a beep "pong") signaling the existence of the parking space S2 on the left side of the vehicle (i.e., the parking space S2 on the back side of the obstacle Z1). At that time, the steering instruction image shown in FIG. 9B is displayed.

Similarly, in the course of traveling from the vehicle position B1 to the position before the vehicle position A3, setting of the detection completion flag following the tentative flag is performed in connection with the obstacle Z4 based on the output data of the distance-measuring sensor 70 on the right side of the vehicle. After the detection completion flag has been set for the obstacle Z4, the parking space available flag which represents the existence of the parking space S5 on the back side of the obstacle Z4 is set, at the vehicle position A3 where the length of a section in which there is no row of points becomes greater than or equal to a predetermined length L2. At that time, if the deflection angle α meets |α|<θ2, and the vehicle speed is low within a predetermined range, the information output control section 42 outputs a notice (i.e., a beep "pong") signaling the existence of the parking space S5 on the right side of the vehicle (i.e., the parking space S5 on the back side of the obstacle Z4). At that time, the steering instruction image as shown in FIG. 9B (but reversed from left to right because this is the case of tandem type parking on right side) is displayed.

In a like manner, with respect to the parking space S3, various items of information will be output at the vehicle position A4 in a similar manner as is the case with the parking space S6, and various items of information will be output at the vehicle position A5 in a similar manner as is the case with the parking space S5.

In this way, according to the present invention, each time when new parking space is detected as a result of the traveling of the vehicle, outputs of the notice (i.e., a beep "pong") and transition of the screen to the steering guidance image are performed. Therefore, the driver can easily recognize the position of the parking space detected this time and the timing of starting to turn the steering wheel for each parking space detected one after another as a result of the traveling of the vehicle. Further, since the guidance notice of the parking space is performed in consideration of the deflection angle α of the vehicle, it becomes possible to determine the parking intention of the driver with high accuracy. It is noted that a guidance image or steering instruction image representing the positions of the parking spaces on the left and right sides may be displayed at the vehicle position where steering assist can be performed for each parking space on the left and right sides.

Figure 12:
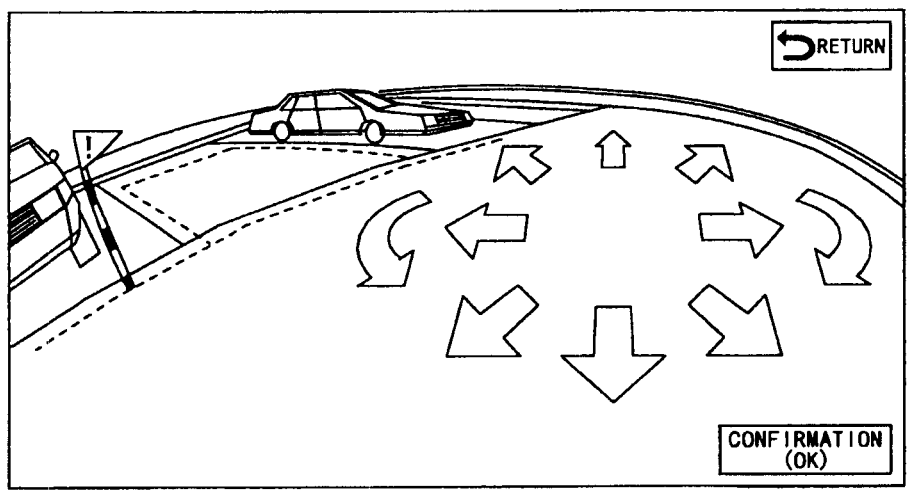
FIG. 12 is an image of an example of a touch switch panel for setting a target-parking position on the display 22.

Next, the parking assist which may be performed when the vehicle rolls backward from the parking start position to the parking space is explained with reference to FIGS. 12 and 1.

When the reverse shift switch 50 is turned on in the parking start position, the parking assisting ECU 12 displays the image (real image) captured by the back monitoring camera 20, which images a scene behind the vehicle with a predetermined viewing angle, on the display 22 provided in the cabin. Then, a target parking frame is superposed on the captured image on the display 22, as shown in FIG. 12 (screen for parallel parking). The target parking frame may be a pictorial part of the display which simulates an actual parking frame or an outside shape of the vehicle. For example, the target parking frame may have a form whose position and direction users can recognize. Two types of target parking frames may be prepared for parallel parking and tandem parking, respectively.

The initial position and direction of the target parking frame displayed on the display 22 corresponds to the target parking position and the target parking direction. The initial position and direction of the target parking frame (corresponds to the target parking position and the target parking direction, respectively) may be confirmed by the user as they are, when the user operates the confirmation switch, for example. Or, the position and direction of the target parking frame may be adjusted with touch switches, etc., for moving the target parking frame in lateral and longitudinal directions and in directions of rotation, as shown in FIG. 12, before operating the confirmation switch.

When the position and direction of the target parking frame are confirmed, the target track calculating section 48 of the parking assisting ECU 12 determines a target track. When the vehicle starts to roll backward, the parking assisting ECU 12 estimates the position of the vehicle during the parking assist control using the travel distance of the vehicle derived from the output signals of the vehicle speed sensor 18 and the steering position derived from the output signals of the steering angle sensor 16. Then, the parking assisting ECU 12 calculates a target steering angle as a function of the amount of departure of the estimated vehicle position from the target track. The parking assisting ECU 12 transmits the calculated target steering angle to the steering system ECU 30. The steering system ECU 30 controls a motor 32 so as to implement the target steering angle. The motor 32 may be disposed in a steering column for rotating a steering shaft by its rotating angle.

It is noted that the target track calculating section 48 may estimate the position of the vehicle during the parking assist control based on the output signals of the steering angle sensor 16 and the vehicle speed sensor 18, calculate a target track based on the difference between the target track previously calculated and the vehicle position estimated, and determine a target steering angle at the vehicle position based on the calculated target track. This calculation of the target track may be performed at every predetermined travel distance of the vehicle (0.5 m, for example). At that time, the target track calculating section 48 may correct the target parking direction and the target parking position (and thus recalculate the target track), if necessary, based on the results of the parking frame recognition process for the captured image of the back monitoring camera 20.

The parking assisting ECU 12 requests the driver to stop the vehicle (or controls the vehicle to stop automatically using the automatic braking system) when the vehicle finally arrives at the target parking position in the target parking direction within the parking space, and then terminates the parking assist control.

The present invention is disclosed with reference to the preferred embodiments. However, it should be understood that the present invention is not limited to the above-described embodiments, and variations and modifications may be made without departing from the scope of the present invention.

For example, although in the above-described embodiments various applications are initiated when the parking switch 52 is turned on, the present invention is not limited to this configuration. For example, they may be initiated if the vehicle speed is lower than a predetermined speed and it is determined that the vehicle is located in a parking area based on the map data of a navigation device, even in the condition where the parking switch 52 is not turned on. In this case, such a configuration where there is no parking switch 52 can be contemplated.

Further, although in the above-described embodiments the distance-measuring sensor 70 suited for detecting the obstacles is used, it is also possible to detect the obstacles by means of image recognition using a camera.

Further, the memory 72 may be a memory dedicated for storing the detection data of the distance-measuring sensor 70 or may be a memory in the parking assisting ECU 12. It is noted that in the former case other data may be stored in the memory in the parking assisting ECU 12.

Further, although in the above-described embodiments the steering instructions are implemented by display (image), the steering instructions may be output audibly.

Further, in the above-described embodiments the length of the row of points may be measured along a referential direction. The referential direction may be parallel to a nominal parking direction in the case of parallel parking and be perpendicular to a nominal parking direction in the case of tandem parking. The referential direction may be determined using the recognition result of a camera or the like, or may be determined based on the deflection angle α. In the latter case, the direction of the vehicle (in a fore-and-aft direction) in a section in which the deflection angle α is less than a certain angle may be determined as the referential direction. With this arrangement, it is possible to determine the referential direction with a simple configuration.

Further, in the above-described embodiments the obstacle is assumed to be a vehicle for the purpose of convenience of explanation; however, the obstacle may include any tangible goods such as a bicycle, a motorbike, walls, more than two pylons, etc.

Further, although in the above-described embodiments the information as to the orientation of the vehicle is obtained and derived from the vehicle speed sensor 18, the steering angle sensor 16 and the deflection angle calculating section 43, the detection results of the yaw rate sensor, the gyroscopic sensor, the declinometer, the GPS, etc., may be used in addition to it or instead of it.

Further, although in the above-described embodiments the obstacle is assumed to be a vehicle for the purpose of convenience of explanation, the obstacle may include any tangible goods such as a bicycle, a motorbike, walls, more than two pylons, etc.

The present application is based on Japanese Priority Application No. 2006-120974, filed on Apr. 25, 2006, the entire contents of which are hereby incorporated by reference.

The invention claimed is:

1. A parking assisting apparatus for assisting parking of a vehicle moving in a forward direction, comprising:
   obstacle detecting means for detecting an obstacle near the vehicle moving in the forward direction;
   parking space detecting means for detecting a parking space based on detected results of the obstacle detecting means;
   deflection angle calculating means for calculating a deflection angle $\alpha$ that represents a change amount of a direction of the vehicle in a predetermined travel distance before a current position of the vehicle, the deflection angle $\alpha$ being calculated based on an output from each of a steering angle sensor and a vehicle speed sensor; and
   information outputting means for outputting an initial notice that informs a driver that the parking space exists adjacent to the obstacle detected by the obstacle detecting means,
   wherein the information outputting means determines whether to output the initial notice based on the deflection angle $\alpha$ calculated by the deflection angle calculating means, and
   wherein the initial notice is output if
      the parking space adjacent to the obstacle detected by the obstacle detecting means is detected by the parking space detecting means, and
      if an absolute value of the deflection angle $\alpha$ calculated by the deflection angle calculating means is within a predetermined range of $0<|\alpha|<\theta 1$, where $\theta 1$ is a predetermined value.

2. The parking assisting apparatus as claimed in claim 1, wherein, when the information outputting means outputs the notice, the information outputting means outputs a steering instruction, and
   wherein, when the vehicle has reached an appropriate parking start position from which the vehicle can be parked in a noticed parking space, the information outputting means informs the driver of reaching the appropriate parking start position.

3. The parking assisting apparatus as claimed in claim 1, wherein an operation of the information outputting means can be switched on or off according to an operation of a user.

4. The parking assisting apparatus as claimed in claim 3, wherein a detection result of the obstacle detecting means or a detection result of the parking space derived therefrom is stored even if the operation of the information outputting means is switched off.

5. The parking assisting apparatus as claimed in claim 1, wherein the information outputting means outputs an image representing a position of the parking space on a display screen, said image being updated when a new parking space is detected.

6. A parking assisting method of assisting parking of a vehicle moving in a forward direction, comprising:
   detecting an obstacle near the vehicle moving in the forward direction;
   detecting a parking space based on results of the detected obstacle;
   calculating a deflection angle that represents a change amount of a direction of the vehicle in a predetermined travel distance before a current position of the vehicle, the deflection angle being calculated based on an output from each of a steering angle sensor and a vehicle speed sensor; and
   outputting an initial notice that informs a driver that the parking space exists adjacent to the obstacle detected during the step of detecting an obstacle,
   wherein prior to the step of outputting the initial notice it is determined whether the initial notice should be output based on the deflection angle calculated during the step of calculating a deflection angle, and
   wherein the initial notice is output if
      the parking space adjacent to the detected obstacle is detected during the step of detecting a parking space, and
      if an absolute value of the deflection angle $\alpha$ calculated during the deflection angle calculating step is within a predetermined range of $0<|\alpha|<\theta 1$, where $\theta 1$ is a predetermined value.

7. A parking assisting apparatus for assisting parking of a vehicle moving in a forward direction, comprising:
   a control device that is connected to an obstacle detecting sensor that detects an obstacle near the vehicle moving in the forward direction, said control device being configured to detect a parking space based on the detected obstacle and being configured to calculate a deflection angle that represents a change amount of a direction of the vehicle in a predetermined travel distance before a current position of the vehicle and to output an initial notice that informs a driver that a parking space exists adjacent to the obstacle detected by the obstacle detecting sensor,
   wherein said control device is further configured to determine whether to output the initial notice based on a calculated deflection angle, the deflection angle being calculated based on an output from each of a steering angle sensor and a vehicle speed sensor, and
   wherein the initial notice is output if
      the parking space adjacent to the obstacle detected by the obstacle detecting sensor is detected during parking space detecting, and
      if an absolute value of the deflection angle $\alpha$ calculated during the deflection angle calculating is within a predetermined range of $0<|\alpha|<\theta 1$, where $\theta 1$ is a predetermined value.

8. The parking assist apparatus as claimed in claim 1, wherein the information outputting means does not inform the driver that the parking space exists when the deflection angle is greater than $\theta 1$.

9. The parking assist apparatus as claimed in claim 1, wherein the parking space detecting means and the deflection angle calculating means are included in an electronic control unit (ECU) disposed in the vehicle, and
   wherein the ECU receives data input from the obstacle detecting means, the steering angle sensor, and the vehicle speed sensor.

* * * * *